United States Patent
Höglund et al.

(10) Patent No.: US 10,989,149 B2
(45) Date of Patent: Apr. 27, 2021

(54) INTERNAL COMBUSTION ENGINE AND METHOD FOR CONTROLLING SUCH AN INTERNAL COMBUSTION ENGINE

(71) Applicant: FREEVALVE AB, Ängelholm (SE)

(72) Inventors: Anders Höglund, Munka Ljungby (SE); Urban Carlson, Helsingborg (SE)

(73) Assignee: FREEVALVE AB, Ängelholm (SE)

( * ) Notice: Subject to any disclaimer, the term of this patent is extended or adjusted under 35 U.S.C. 154(b) by 0 days.

(21) Appl. No.: 16/645,873

(22) PCT Filed: Sep. 10, 2018

(86) PCT No.: PCT/SE2018/050903
§ 371 (c)(1),
(2) Date: Mar. 10, 2020

(87) PCT Pub. No.: WO2019/050464
PCT Pub. Date: Mar. 14, 2019

(65) Prior Publication Data
US 2020/0256288 A1   Aug. 13, 2020

(30) Foreign Application Priority Data
Sep. 11, 2017 (SE) .................................. 1751095-9

(51) Int. Cl.
*F02M 26/01* (2016.01)
*F02D 13/02* (2006.01)
*F02D 41/34* (2006.01)

(52) U.S. Cl.
CPC ......... *F02M 26/01* (2016.02); *F02D 13/0203* (2013.01); *F02D 41/345* (2013.01);
(Continued)

(58) Field of Classification Search
CPC ... F02M 26/01; F02D 13/0203; F02D 41/345; F02D 2200/1002; F02D 2200/101; F02D 2250/18
See application file for complete search history.

(56) References Cited

U.S. PATENT DOCUMENTS

| | | |
|---|---|---|
| 5,367,990 A | 11/1994 | Schechter |
| 6,305,364 B1 | 10/2001 | Ma |

(Continued)

FOREIGN PATENT DOCUMENTS

| | | |
|---|---|---|
| EP | 1178199 | 2/2002 |
| FR | 2913066 | 8/2008 |

(Continued)

OTHER PUBLICATIONS

International Search Report, PCT/SE2018/050903, dated Nov. 22, 2018.
Written Opinion, PCT/SE2018/050903, dated Nov. 22, 2018.

*Primary Examiner* — Hieu T Vo
(74) *Attorney, Agent, or Firm* — Nixon & Vanderhye

(57) ABSTRACT

An internal combustion engine includes combustion chambers, each having a controllable intake valve opening and closing an intake port, a controllable exhaust valve opening and closing an exhaust port, a piston displaceable back and forth in the combustion chamber between a top dead center and a bottom dead center, and a fuel injector. The engine further including an intake manifold connected to the intake port of each combustion chamber. The engine can be operated in a low load mode, wherein each combustion chamber is driven in four-stroke operation including a 720 crank angle degrees cycle, and opens the intake port during the exhaust stroke, the intake port starting to open in 610-690 CAD, closing the exhaust port during the exhaust stroke, becoming fully closed in 630-710 CAD, forcing exhaust gas (Continued)

into the intake manifold by the piston, and mixing fuel and exhaust gas in the intake manifold.

20 Claims, 1 Drawing Sheet

(52) U.S. Cl.
CPC .................. *F02D 2200/101* (2013.01); *F02D 2200/1002* (2013.01); *F02D 2250/18* (2013.01)

(56) References Cited

U.S. PATENT DOCUMENTS

| | | |
|---|---|---|
| 9,885,261 B2 | 2/2018 | Hoglund |
| 2001/0017123 A1 | 8/2001 | Raab et al. |
| 2015/0184558 A1 | 7/2015 | Hoglund |
| 2016/0369666 A1 | 12/2016 | Hoglund |

FOREIGN PATENT DOCUMENTS

| | | |
|---|---|---|
| SE | 1350849 | 2/2015 |
| SE | 537203 | 3/2015 |

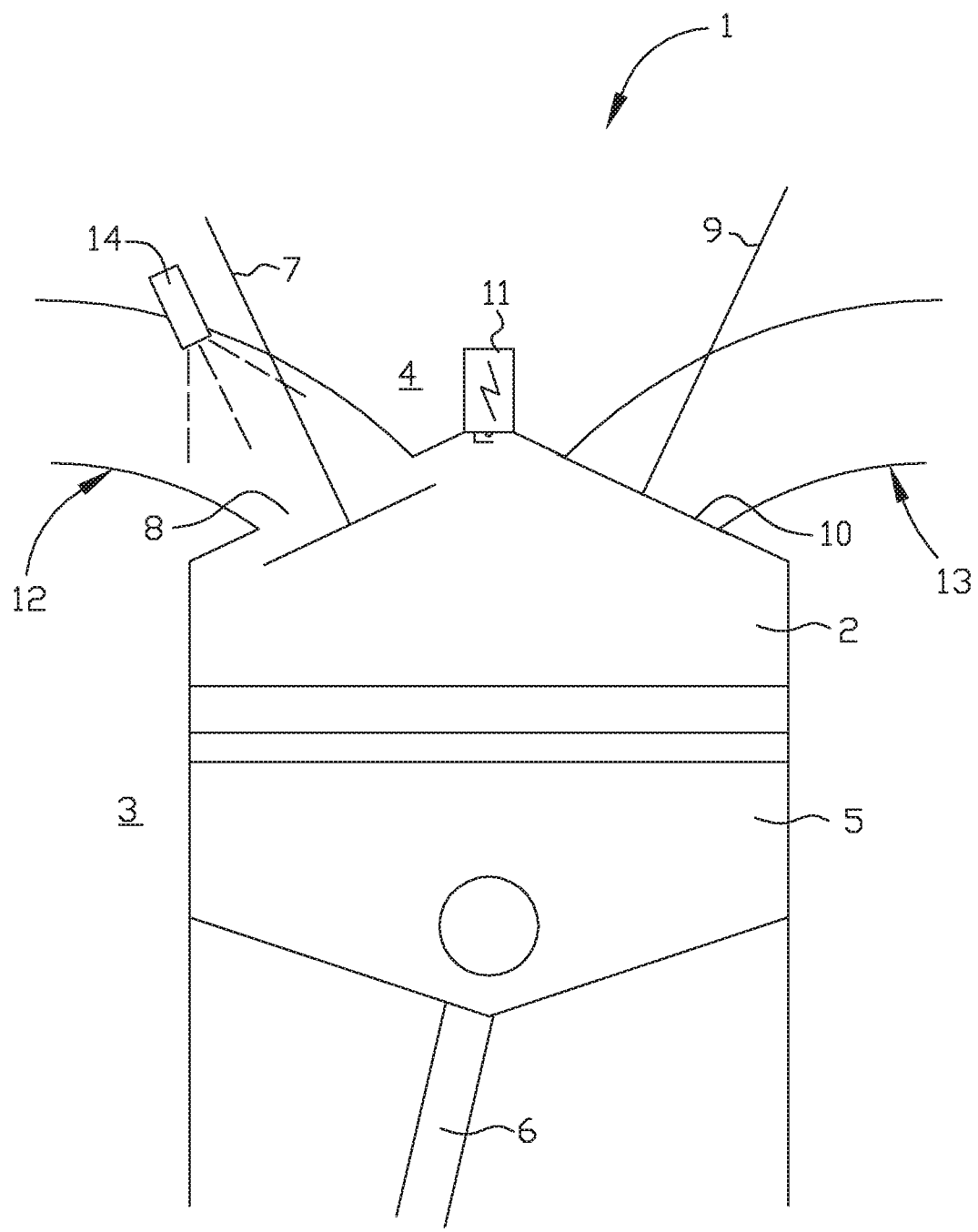

INTERNAL COMBUSTION ENGINE AND METHOD FOR CONTROLLING SUCH AN INTERNAL COMBUSTION ENGINE

TECHNICAL FIELD OF THE INVENTION

The present invention relates generally to the field of internal combustion engines suitable for powering a vehicle, such as a car or a truck, a boat, etc., or a machine such as an electric power generator or the like. Further, the present invention relates specifically to an internal combustion engine suitable for a performance car, i.e. a car that is designed and constructed specifically for speed. The internal combustion engine is not restricted to be powered by any specific type of fuel, i.e. both liquid fuel and gaseous fuel are conceivable.

The inventive internal combustion engine comprises a set of combustion chambers, each combustion chamber being provided with a controllable intake valve configured for opening and closing an intake port, a controllable exhaust valve configured for opening and closing an exhaust port, a piston displaceable back and forth in said combustion chamber between a top dead center (TDC) and a bottom dead center (BDC), and a fuel injector. The internal combustion engine comprises further an intake manifold connected to the intake port of each combustion chamber of said set of combustion chambers.

The invention also relates to a method of operating such an internal combustion engine.

BACKGROUND OF THE INVENTION

In internal combustion engines operated in four-stroke cycles, a mixture of air and fuel is provided into a combustion chamber, i.e. cylinder, during an intake stroke. The air-fuel mixture is compressed during a compression stroke, and in connection with the end of the compression stroke the air-fuel mixture is ignited, either by a spark plug or spontaneously due to the compression. The heat and energy released by the burning of the air-fuel mixture causes a further rise in pressure in the combustion chamber which is used to do work against a movable wall of the combustion chamber, i.e. the piston, which work is converted into rotational movement of a crank shaft attached to the piston via a piston rod, during a power stroke. The exhaust gas formed from the burning of the air-fuel mixture is then evacuated from the combustion chamber, during an exhaust stroke, and thereafter a new cycle begins. The cycles of the different combustion chambers of the internal combustion engine are offset in relation to each other.

With rising concerns of the environment and pollution caused by the exhaust gas from internal combustion engines there is a need to lower harmful emissions from internal combustion engines while at the same time maintaining or increasing the efficiency of conversion of the chemical energy in the fuel to kinetic energy of the crankshaft, thereto it is a need to decrease fuel consumption.

One known attempt to reduce emissions is to recirculate a part of the exhaust gas from the exhaust manifold of the internal combustion engine for mixing said recirculated exhaust gas with fresh air before introduction into the internal combustion engine, so-called external Exhaust Gas Recirculation.

Another known attempt to reduce emissions is to pre-condition the fuel in order to improve ignitability. Such a system, called internal Exhaust Gas Recirculation, is disclosed in U.S. Pat. No. 6,305,364. In '364 the exhaust gas, due to a generated underpressure in the intake manifold, is sucked into the intake manifold during a prolonged intake valve and exhaust valve overlap period, during the exhaust stroke. According to '364 the fuel has to be injected during the valve overlap period entailing that fuel may escape through the open exhaust port.

OBJECT OF THE INVENTION

The present invention aims at obviating the disadvantages and failings of previously known internal combustion engines comprising a set of combustion chambers and wherein part of the exhaust gas formed in the combustion chamber is forced into the intake manifold and mixed with fuel. A primary object of the present invention is to provide an improved internal combustion engine of the initially defined type generating less emission and consuming less fuel, due to better ignitability.

It is yet another object of the invention is to provide an improved internal combustion engine having a more stable ignition from cycle to cycle.

It is another object of the present invention to provide cooling of the internally recirculated exhaust gas, in order to reduce the NOx generation and thereby reducing the risk of knocking.

It is another object of the present invention to use of a buffer gas (exhaust gas) in the gas for combustion since this result in a cooler combustion, increased knock resistance and consequently the possibility of increasing compression ratio, and a better thermal efficiency.

SUMMARY OF THE INVENTION

According to the invention at least the primary object is attained by means of the initially defined internal combustion engine and method having the features defined in the independent claims. Preferred embodiments of the present invention are further defined in the dependent claims.

The present invention is a strategy for controlling the operation of an internal combustion engine during a low load mode, also known as part load mode, in order to minimize fuel consumption and minimize emissions, such as NOx.

According to a first aspect of the present invention, there is provided an internal combustion engine of the initially defined type, the internal combustion engine being configured to be operated in a low load mode (LL), wherein each combustion chamber is configured to be driven in four-stroke operation comprising a 720 crank angle degrees cycle, wherein the internal combustion engine is configured to perform the activities: open the intake port during the exhaust stroke, the intake port starting to open in the range 610 to 690 CAD, and close the exhaust port during the exhaust stroke, the exhaust port becomes fully closed in the range 630 to 710 CAD, wherein the exhaust gas is forced into the intake manifold by means of the piston, and mix fuel and exhaust gas in the intake manifold.

According to a second aspect of the present invention, there is provided a method for controlling such an internal combustion engine.

Thus the present invention is based on the insight that by closing the exhaust port and instead pressing the hot exhaust gas into the intake manifold via the intake port during the exhaust stroke and mixing the exhaust gas and fuel in the intake manifold before re-introduction of the gas-fuel mixture into the combustion chamber, the exhaust gas is cooled off, the fuel is pre-vaporized, and the gas-fuel mixture is substantially uniform already at re-introduction into the combustion chamber. These positive effects lead to reduced fuel consumption and reduced emissions.

According to a preferred embodiment of the present invention, the step of forcing the exhaust gas into the intake manifold by means of the piston also includes, when the exhaust port is fully closed and the intake port is open, adding the fuel into the flow of exhaust gas that is pressed into the intake manifold. Thereby, the risk of having unburnt fuel escaping through the exhaust port is completely eliminated.

According to a preferred embodiment of the present invention, the fuel is injected into the intake manifold and the fuel injection takes place in the range 270 to 720+30 CAD. Preferably, the fuel injection takes place in the range that start when the exhaust port becomes fully closed during the exhaust stroke, and that stop at 720+30 CAD. Thereby, the risk of having unburnt fuel escaping through the exhaust port is completely eliminated.

According to a preferred embodiment of the present invention, the fuel is added/injected at the same time as the exhaust gas is pressed into the intake manifold via the intake port. According to an alternative embodiment the fuel is added/injected in the intake manifold while the intake port is closed.

According to a preferred embodiment of the present invention, the intake port starts to open in the range 665 to 690 CAD, and the exhaust port becomes fully closed in the range 675 to 710 CAD.

The maximum output torque [Nm] of the internal combustion engine is dependent on engine speed [rpm], and according to a preferred embodiment of the present invention the internal combustion engine is configured to shift from low load mode (LL) to a high load mode (HL) at a predetermined first torque level (T1). Thereto the internal combustion engine is preferably configured to shift from high load mode (HL) to low load mode (LL) at a predetermined second torque level (T2). Preferably, t the first torque level (T1) is greater than the second torque level (T2), in order to obtain distinct changeover between the high load mode (HL) and low load mode (LL).

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawing, wherein FIG. 1 is a schematic side view of a combustion chamber of an internal combustion engine according to the present invention.

DETAILED DESCRIPTION OF PREFERRED EMBODIMENTS OF THE INVENTION

The present invention relates generally to the field of internal combustion engines suitable for powering a vehicle or a machine. The inventive internal combustion engine, generally designated 1, comprises a set of combustion chambers. The set/plurality of combustion chambers comprises at least two separate combustion chambers 2, also known as cylinders. However, the internal combustion engine 1 may comprise more combustion chambers, such as 3, 4, 6, 8, 10, 12 or 16. Each combustion chamber 2 is preferably cylindrical.

The internal combustion engine 1 is a four-stroke engine, i.e. configured to be driven in four-stroke operation comprising a 720 crank angle degrees (CAD) cycle. The four strokes are "intake" during which air/gas and fuel are delivered into the combustion chamber 2, "compression" during which the air-fuel mixture in the combustion chamber 2 is compressed, "power/combustion" during which the air-fuel mixture is ignited and combusted, and "exhaust" during which the exhaust gas formed by the combustion of the air-fuel mixture is evacuated, also known as scavenged, from the combustion chamber 2. Preferably the internal combustion engine 1 is constituted by a spark-ignition engine, i.e. in which the air-fuel mixture is ignited by a spark from a sparkplug, but may also be constituted by a spontaneous/compression-ignition engine. The internal combustion engine 1 is preferably configured to be driven by petrol/gasoline, but may alternatively be configured to be driven by diesel, gas, ethanol, etc. and/or a mixture of said fuels.

Reference is made to FIG. 1 disclosing a schematic side view of a first embodiment of the inventive internal combustion engine 1.

The internal combustion engine 1 comprises an engine block 3 provided with said set of combustion chambers or cylinders 2. Each combustion chamber 2 is defined radially by a stationary cylinder wall, and is defined axially by a stationary cylinder head 4 and a displaceable piston 5, respectively. The cylinder head 4 may be releasably connected to the engine block 3 or may be integral with the engine block 3. The piston 5 is configured displaceable back and forth in the axial direction within the combustion chamber 2 between a top dead center (TDC) and a bottom dead center (BDC), and is connected to a revolving crankshaft via a piston rod 6, wherein the linear movement of the piston 5 is converted into rotational movement of the crankshaft. Thus, the volume of the combustion chamber 2 changes cyclically as the piston 5 moves up and down in the cylinder.

Each combustion chamber 2 is provided with at least one controllable intake valve 7 configured for opening and closing an intake port 8, at least one controllable exhaust valve 9 configured for opening and closing an exhaust port 10. Preferably, each combustion chamber 2 comprises two intake ports and two exhaust ports, each port having a controllable valve that preferably are independently controlled. It shall be pointed out that two intake valves and/or the two exhaust valves, respectively, may be operated jointly. Thus, herein the invention is illustrated using one intake valve 7 and one exhaust valve 9, and it shall be realized that in applications having two intake valves and/or exhaust valves these valves can be kept closed or operated jointly with the disclosed valves.

Thereto, in the disclosed embodiment the combustion chamber 2 is provided with a spark plug 11. It shall be realized that the intake port 8, the exhaust port 10 and the spark plug 11 are arranged in the cylinder head 4.

The intake valve 7 and the exhaust valve 9 are preferably of poppet valve type each having a valve stem and a valve disk attached to the lower end of the valve stem. In the closed position the valve disk abuts the material surrounding the corresponding port to prevent passage of fluid through the port, whereas in the open position the valve disc is displaced vertically down into the combustion chamber 2 in order to uncover the port and allow fluid to pass through the port and around the edge of the valve disk. The maximum displacement of the valves is preferably in the range 5-10 millimeters.

Each of the intake valve 7 and the exhaust valve 9 is preferably operated by means of a corresponding valve actuator. Thus, in the context of the present invention a valve actuator allows the corresponding valve to be freely operated without the operation of the valve being slaved to the operation of the internal combustion engine 1, in particular the angular position of the crankshaft of the internal combustion engine, via a camshaft. A controllable valve operated by means of an actuator is for example described in the patent literature documents US2015184558, SE1350849 and SE537203. A controllable valve can be opened and closed at any time and the degree of lift of the valve is not fixed. Thus, the inventive internal combustion engine 1 comprises no camshaft, and is thus camshaft-free. The inventive internal combustion engine 1 is preferably also throttle-free. Preferably, the actuator uses both pneumatic and hydraulic for its operation.

The internal combustion engine 1 comprises an intake manifold 12 for providing air/gas to the combustion chamber 2 from an air intake, and an exhaust manifold 13 for evacuating exhaust gas from the combustion chamber 2 to an exhaust outlet. Usually at least one muffler and/or at least one catalytic converter are arranged adjacent the exhaust outlet, for decreasing the noise of operating of the internal combustion engine and/or for treating the exhaust gas, before the exhaust gas is eventually led off to the atmosphere.

Air/gas for combustion is supplied to the combustion chamber 2 from the intake manifold 12 via the intake port 8 of each combustion chamber 2 of said set of combustion chambers. Each combustion chamber 2 is provided with an individual intake pipe/runner that is part of the intake manifold 12. The exhaust manifold 13 is connected to the exhaust port 10 of each combustion chamber 2 of said set of combustion chambers. Each combustion chamber 2 is provided with an individual exhaust pipe/runner that is part of the exhaust manifold 13.

The internal combustion engine 1 further comprises an electronic control unit (ECU), wherein the ECU is configured to at least control the opening and closing of the intake valve 7 and the exhaust valve 9, using the corresponding actuators. The internal combustion engine 1 also comprises a sensor for monitoring the rotation of the crankshaft, wherein said sensor is operatively connected to said ECU.

In the disclosed embodiment, a fuel injector 14 is provided in the intake runner/pipe (intake manifold 12) for injecting fuel into the intake manifold 12 towards the intake port 8. In an alternative embodiment the inventive internal combustion engine is provided with direct injection of the fuel into the combustion chambers 2.

As is known to a person skilled in the art a four-stroke internal combustion engine conventionally proceeds through four strokes in one cycle, namely (1) Intake 0 to 180 CAD—this stroke beginning with the piston 5 at its highest position, i.e. top dead center closest to the cylinder head 4, and comprising displacement of the piston 5 downwards while a mixture of gas and fuel is introduced into the combustion chamber 2, (2) Compression 180 to 360 CAD—this stroke beginning with the piston 5 at its lowest position, i.e. bottom dead center, and comprising closing the intake valve 7 and moving the piston 5 upwards towards the cylinder head 4 while compressing the gas-fuel mixture, (3) Power 360 to 540 CAD—igniting the gas-fuel mixture wherein the resulting pressure caused by the combustion of the fuel will displace the piston 5 downwards and away from the cylinder head 4, and (4) Exhaust 540 to 720 CAD—opening the exhaust valve 9 for allowing the exhaust gas formed by the combustion of the gas-fuel mixture to evacuate from the combustion chamber 2 while the piston 5 once more is displaced towards the top dead center. The ignition of the gas-fuel mixture takes place in connection with the piston 5 being located at the upper dead center between the compression stroke and the power stroke.

The inventive internal combustion engine 1 is configured to be operated in at least a low load mode (LL) and preferably also in a high load mode (HL). The low load mode is also known as part load mode. The maximum output torque [Nm] of the internal combustion engine 1 is dependent on engine speed [rpm], and the output torque of the internal combustion engine is in this context equivalent with driver/operator requested output torque via an accelerator pedal. During high load mode (HL) the driver/operator requests elevated output torque via the accelerator pedal, and during low load mode (LL) the driver/operator request low or moderate output torque. According to the inventive method the internal combustion engine 1 is operated in low load mode (LL).

The ECU is configured to adjust the filling rate of the combustion chambers 2 in view of the engine speed and the requested output torque, i.e. the amount of air/gas going into a combustion chamber 2 in relation to the volume of the combustion chamber. The ECU is also configured for varying the amount of fuel injected into each combustion chamber to provide a suitable relationship, or lambda value, between oxygen and fuel.

The internal combustion engine 1 is configured to shift from low load mode (LL) to high load mode (HL) at a predetermined first torque level (T1) and preferably configured to shift from high load mode (HL) to low load mode (LL) at a predetermined second torque level (T2). Preferably, the first torque level (T1) is greater than the second torque level (T2), and preferably the first torque level (T1) is 50% of said maximum output torque, and preferably the second torque level (T2) is 45% of the said maximum output torque. The internal combustion engine 1 is configured to shift from the low load mode (LL) to the high load mode (HL) when the filling rate of all combustion chambers is maximal and the internal combustion engine 1 is providing maximum performance in the low load mode (LL).

It shall be pointed out that the internal combustion engine 1 may be temporarily placed in Economy Mode, wherein the internal combustion engine 1 is prevented to shift to the high load mode (HL) or the first torque level (T1) is increased. The increased first torque level (T1) in the Economy Mode is for instance 80% of the maximum output torque. The second torque level (T2) may also be increased in the Economy Mode, for instance to 70% of the maximum output torque.

It shall also be pointed out that the internal combustion engine 1 may be temporarily placed in Sport Mode, wherein the internal combustion engine 1 is prevented to shift to the low load mode (LL) or the first torque level (T1) and the second torque level (T2) are decreased. The decreased first torque level (T1) in the Sport Mode is for instance 20% of the maximum output torque, and the decreased second torque level (T2) in the Sport Mode is for instance 15% of the maximum output torque.

The inventive internal combustion engine 1 is configured to perform the inventive method comprising several essential activities/steps. It shall be pointed out that the mutual order of the activities listed in the claims is not delimiting for the invention. The essential activities/steps of the invention are constituted by:

opening the intake port 8 during the exhaust stroke, the intake port 8 starting to open in the range 610 to 690 CAD, closing the exhaust port 10 during the exhaust stroke, the exhaust port 10 becomes fully closed in the range 630 to 710 CAD, forcing the exhaust gas into the intake manifold 12 by means of the piston 5, and mixing fuel and exhaust gas in the intake manifold 12.

It shall be realized that the essential activities/steps mentioned above are preceded by suitable/conventional activities/steps, i.e. intake stroke, compression stroke, power stroke and beginning of exhaust stroke.

Thus, according to the invention the exhaust port 10 becomes fully closed and the intake port 8 starts to open before the piston 5 reaches top dead center during the exhaust stroke. Irrespective of the fuel is added/injected into the intake manifold 12 or into the combustion chamber 2, the substantial mixing of the fuel and gas takes place in the intake manifold 12. During the mixing of the exhaust gas and fuel in the intake manifold, the fuel is evaporated and the exhaust gas is cooled down. Preferably substantially all fuel is added/injected when the exhaust port 10 is closed, the intake port 8 is open and exhaust gas is pressed into the intake manifold 12 by means of the piston 5. Preferably the fuel injection takes place within 60 CAD, preferably within 40 CAD. Best mixing of the exhaust gas and fuel is achieved if the fuel is added/injected directly into the flow of exhaust gas that is pressed into the intake manifold 12.

According to the disclosed embodiment the fuel is added/ injected into the intake manifold 12 by means of the fuel injector 14, and the fuel injection preferably takes place in the range 270 to 720+30 CAD. Thus, the fuel can be injected after the intake valve 7 has become closed after the intake stroke of the present cycle, either when the intake valve 7 is still closed and/or when the intake port 8 is opened during the exhaust stroke. According to the alternative embodiment the fuel is added/injected into the combustion chamber 2 by means of the fuel injector 14 when the intake valve 7 is open, the exhaust valve 9 is closed and all the exhaust gas is forced/pressed into the intake manifold 12.

In one embodiment the fuel injection takes place in the range that start when the exhaust port 10 becomes fully closed during the exhaust stroke, and that stop at 720+30 CAD. Preferably the fuel injection starts in the range 610 to 670 CAD. Thus, it is preferred to inject the fuel when the intake valve 7 is open during the exhaust stroke and the exhaust gas flow into the intake manifold 12. According to another embodiment the fuel injection takes place in the range that start at 270 and that stop when the intake port 8 starts to open during the exhaust stroke, i.e. all fuel is injected when the intake valve 7 is closed such that all fuel is ready to mix with (be added to) the exhaust gas when the intake valve 7 is opened and the exhaust gas is pressed into the intake manifold 12 by means of the piston 5.

According to a preferred embodiment the moment the exhaust port 10 becomes fully closed and the moment the intake port 8 starts to open, takes place within 40 CAD, preferably within 20 CAD. Thus, the valve overlap period shall be as short as possible, but long enough for the exhaust gas to be continuously evacuated from the combustion chamber also during the shift from open exhaust valve 9 to open intake valve 7. Preferably the exhaust port 10 becomes fully closed in the range 630 to 690 CAD, and preferably the intake port 8 starts to open in the range 610 to 670 CAD. Preferably the intake valve 7 starts to open before the exhaust valve 9 is fully closed. Alternatively, it is preferred that the intake port 8 starts to open in the range 665 to 690 CAD, and that the exhaust port 10 becomes fully closed in the range 675 to 710 CAD. It is most preferred that the intake port 8 starts to open in the range 665 to 670 CAD. It is most preferred that the exhaust port 10 becomes fully closed in the range 675 to 690. In order to prevent knocking at the same time as enough internal EGR is achieved in low load mode.

It shall be pointed out that according to a preferred embodiment the volume of the individual intake runner should be big enough to ensure that the exhaust gas pressed into the intake manifold 12 by means of the piston 5 does not slip over into an intake runner of a neighboring combustion chamber 2. Thus, the mixing of the fuel and exhaust gas takes place in the individual intake runner and is sucked into the same combustion chamber during the intake stroke of the following cycle.

In some applications the intake valve 7 can be open or fully open when the piston 5 reaches top dead center, especially gasoline engines, and in some applications the intake valve 7 has to be closed when the piston 5 reaches top dead center in order not to become damaged by the piston 5, especially diesel engines. In the first type applications the intake valve 7 may be kept open past 720 CAD. According the second type application the intake valve 7 has to be fully closed at 710 CAD, and it shall be pointed out that this may also be applied to the first type application. Thereafter, the intake port 8 is opened during the intake stroke in order to let the gas-fuel mixture to be sucked into the combustion chamber 2. According to a preferred embodiment the intake port 8 is kept closed until at least 30 CAD, preferably until at least 45 CAD, in order to create underpressure in the combustion chamber 2. When the gas-fuel mixture is then sucked into the combustion chamber 2 at great speed the cylinder is cooled down.

Since the exhaust gas and fuel is mixed in the intake manifold, a better and more efficient combustion is obtained generating less emission, and a more stable combustion from cycle to cycle resulting in decreased fuel consumption.

The ECU or similar computer readable medium having stored thereon a computer program product comprises instructions to cause the inventive internal combustion engine 1 to execute the steps of the inventive method.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall be pointed out that controlling the opening is also to be understood as controlling the closing. Controlling the opening is further to be understood as controlling any of the valve lift, the duration of opening, and when in the operation/cycle of the internal combustion engine the valve is opened.

It shall also be pointed out that all information about/ concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even though it is not explicitly stated that features from a specific embodiment may be combined with features from another embodiment, the combination shall be considered obvious, if the combination is possible.

The invention claimed is:

1. An internal combustion engine (1) comprising a set of combustion chambers, each combustion chamber (2) being provided with:
- a controllable intake valve (7) configured for opening and closing an intake port (8),
- a controllable exhaust valve (9) configured for opening and closing an exhaust port (10),
- a piston (5) displaceable back and forth in said combustion chamber (2) between a top dead center (TDC) and a bottom dead center (BDC), and
- a fuel injector (14), the internal combustion engine (1) further comprising an intake manifold (12) connected to the intake port (8) of each combustion chamber of said set of combustion chambers, wherein the internal combustion engine (1) is configured to be operated in a low load mode (LL), wherein each combustion chamber (2) is configured to be driven in four-stroke operation comprising a 720 crank angle degrees cycle, wherein the internal combustion engine (1) is configured to perform the following activities:
- open the intake port (8) during the exhaust stroke, the intake port (8) starting to open in the range 610 to 690 CAD, and close the exhaust port (10) during the exhaust stroke, the exhaust port (10) becomes fully closed in the range 630 to 710 CAD, wherein the exhaust gas is forced into the intake manifold (12) by means of the piston (5), and
- mix fuel and exhaust gas in the intake manifold (12).

2. A non-transitory computer-readable medium on which is stored a computer program comprising instructions which, when executed by a computer, cause the internal combustion engine according to claim 1 to execute a method for controlling the internal combustion engine (1), the method comprising:
- opening the intake port (8) during the exhaust stroke, the intake port (8) starting to open in the range 610 to 690 CAD,
- closing the exhaust port (10) during the exhaust stroke, the exhaust port (10) becomes fully closed in the range 630 to 710 CAD,
- forcing the exhaust gas into the intake manifold (12) by means of the piston (5), and
- mixing fuel and exhaust gas in the intake manifold (12).

3. A method for controlling an internal combustion engine (1) comprising a set of combustion chambers, each combustion chamber (2) being provided with:
- a controllable intake valve (7) configured for opening and closing an intake port (8),
- a controllable exhaust valve (9) configured for opening and closing an exhaust port (10),
- a piston (5) displaceable back and forth in said combustion chamber (2) between a top dead center (TDC) and a bottom dead center (BDC), and
- a fuel injector (14), the internal combustion engine (1) further comprising an intake manifold (12) connected to the intake port (8) of each combustion chamber of said set of combustion chambers, the method being wherein the internal combustion engine (1) is operated in a low load mode (LL), wherein each combustion chamber (2) is driven in four-stroke operation comprising a 720 crank angle degrees cycle, wherein the method comprises the activities of:
- opening the intake port (8) during the exhaust stroke, the intake port (8) starting to open in the range 610 to 690 CAD,
- closing the exhaust port (10) during the exhaust stroke, the exhaust port (10) becomes fully closed in the range 630 to 710 CAD,
- forcing the exhaust gas into the intake manifold (12) by means of the piston (5), and
- mixing fuel and exhaust gas in the intake manifold (12).

4. The method according to claim 3, wherein the step of forcing the exhaust gas into the intake manifold (12) by means of the piston (5) also includes, when the exhaust port (10) is fully closed and the intake port (8) is open, adding the fuel into the flow of exhaust gas that is pressed into the intake manifold (12).

5. The method according to claim 4, wherein fuel injection takes place in the range that start when the exhaust port (10) becomes fully closed during the exhaust stroke, and that stop at 720+30 CAD.

6. The method according to claim 4, wherein the intake port (8) starts to open in the range 665 to 690 CAD, and the exhaust port (10) becomes fully closed in the range 675 to 710 CAD.

7. The method according to claim 3, wherein the method comprises the activity:
- injecting fuel into the intake manifold (12), fuel injection taking place in the range 270 to 720+30 CAD.

8. The method according to claim 7, wherein fuel injection takes place in the range that start at 270, and that stop when the intake port (8) starts to open during the exhaust stroke.

9. The method according to claim 7, wherein fuel injection takes place in the range that start when the exhaust port (10) becomes fully closed during the exhaust stroke, and that stop at 720+30 CAD.

10. The method according to claim 3, wherein fuel injection takes place within 60 CAD.

11. The method of claim 10, wherein fuel injection takes place with 40 CAD.

12. The method according to claim 3, wherein the moment the exhaust port (10) becomes fully closed and the moment the intake port (8) starts to open, takes place within 40 CAD.

13. The method of claim 12, wherein the moment the exhaust port (10) becomes fully closed and the moment the intake port (8) starts to open, takes place within 20 CAD.

14. The method according to claim 3, wherein the intake port (8) starts to open in the range 665 to 690 CAD, and the exhaust port (10) becomes fully closed in the range 675 to 710 CAD.

15. The method according to claim 3, wherein the intake port (8) starts to open in the range 610 to 670 CAD, and the exhaust port (10) becomes fully closed in the range 630 to 690 CAD.

16. The method according to claim 3, wherein the maximum output torque [Nm] of the internal combustion engine (1) is dependent on engine speed [rpm], wherein the internal combustion engine (1) shift from low load mode (LL) to a high load mode (HL) at a predetermined first torque level (T1).

17. The method according to claim 16, wherein the internal combustion engine (1) shift from high load mode (HL) to low load mode (LL) at a predetermined second torque level (T2).

18. The method according to claim 17, wherein the first torque level (T1) is greater than the second torque level (T2).

19. The method according to claim 16, wherein the first torque level (T1) is 50% of said maximum output torque.

20. The method according to claim 16, wherein the second torque level (T2) is 45% of the said maximum output torque.

* * * * *